United States Patent
Williams et al.

(10) Patent No.: US 7,210,553 B2
(45) Date of Patent: May 1, 2007

(54) STEERING APPARATUS

(75) Inventors: Daniel E. Williams, Lebanon, IN (US); Bob Johnson, Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 109 days.

(21) Appl. No.: 11/077,457

(22) Filed: Mar. 10, 2005

(65) Prior Publication Data
US 2006/0201735 A1 Sep. 14, 2006

(51) Int. Cl.
*B62D 5/06* (2006.01)
*B62D 5/12* (2006.01)

(52) U.S. Cl. ............... 180/402; 180/403; 180/428; 180/431; 180/437

(58) Field of Classification Search ........ 180/402, 180/403, 405, 428, 437, 431
See application file for complete search history.

(56) References Cited

U.S. PATENT DOCUMENTS

| | | | |
|---|---|---|---|
| 3,709,099 A | | 1/1973 | Dumeah |
| 3,944,015 A | * | 3/1976 | Bishop .................. 180/428 |
| 4,016,949 A | * | 4/1977 | Plate et al. ............ 180/437 |
| 4,137,989 A | * | 2/1979 | Rehfeld ................. 180/428 |
| 4,172,507 A | * | 10/1979 | Millard ................. 180/428 |
| 4,463,557 A | * | 8/1984 | Miller et al. ............ 60/422 |
| 4,488,615 A | * | 12/1984 | Millard ................. 180/428 |
| 4,492,283 A | * | 1/1985 | Bertin .................. 180/428 |
| 4,522,419 A | * | 6/1985 | Yoshida et al. ........ 280/93.515 |
| 4,580,651 A | * | 4/1986 | Adams ................. 180/422 |
| 4,838,106 A | * | 6/1989 | Adams ................. 74/388 PS |
| 5,582,207 A | | 12/1996 | Gilbert et al. |
| 5,851,015 A | * | 12/1998 | Klosterhaus .......... 280/93.51 |
| 5,975,573 A | | 11/1999 | Belleau |
| 6,546,322 B2 | | 4/2003 | Williams |
| 6,655,709 B2 | | 12/2003 | Sherwin et al. |
| 6,868,935 B2 | * | 3/2005 | Jaberg .................. 180/437 |
| 6,879,118 B2 | * | 4/2005 | Cao et al. .............. 318/34 |

* cited by examiner

*Primary Examiner*—Lesley D. Morris
*Assistant Examiner*—Marc A. Scharich
(74) *Attorney, Agent, or Firm*—Tarolli, Sundheim, Covell & Tummino LLP

(57) ABSTRACT

An apparatus (10) for use in turning steerable vehicle wheels (12,14) includes a connector member (28) which connects a first end portion (70) of the rack (66) with a first steerable vehicle wheel (14). A second end portion (72) of the rack (66) is spaced from the second steerable vehicle wheel (12) and is free of a connection with a member which extends between the second end portion of the rack and the second steerable vehicle wheel. A force transmitting member (32) extends between the steerable vehicle wheels (12,14) and extends through a hydraulic motor (42). Upon rotation of a steering wheel, a valve connected with a pinion gear (62) effects operation of the motor (42) to turn the steerable vehicle wheels (12,14).

7 Claims, 1 Drawing Sheet

STEERING APPARATUS

BACKGROUND OF THE INVENTION

The present invention relates to a new and improved apparatus for turning steerable vehicle wheels upon manual rotation of a steering wheel.

Steerable vehicle wheels have previously been turned by a rack and pinion steering system. The rack and pinion steering system may include a hydraulic motor which is connected with the steerable vehicle wheels by tie rods in the manner disclosed in U.S. Pat. No. 3,709,099. Other known rack and pinion steering systems are disclosed in U.S. Pat. Nos. 5,851,015 and 5,975,573.

Steerable vehicle wheels have also been turned by steer-by-wire steering systems. In a known steer-by-wire steering system, there has been no mechanical connection between a steering wheel and a steering apparatus connected with steerable vehicle wheels. In at least one known steer-by-wire steering system, a transmitter assembly associated with the steering wheel sends a signal to a receiver assembly associated with a steering apparatus connected with the steerable vehicle wheels. This steering apparatus is actuated in accordance with the signal received by the receiver assembly. Known steer-by-wire steering systems are disclosed in U.S. Pat. Nos. 6,546,322 and 6,655,709.

SUMMARY OF THE INVENTION

The present invention relates to a new and improved apparatus for use in turning steerable vehicle wheels upon manual rotation of a steering wheel. The apparatus includes a connector member which connects a first end portion of a rack with a first steerable vehicle wheel. A second end portion of the rack is spaced from a second steerable vehicle wheel and is free of connection with a member which extends between the second end portion of the rack and the second steerable vehicle wheel.

A force transmitting member has first and second end portions connected with the steerable vehicle wheels. A hydraulic motor is connected with the force transmitting member. Upon manual rotation of a steering wheel, a valve is actuated. The valve is connected with a pinion gear which is disposed in meshing engagement with the rack. Actuation of the valve effects operation of a hydraulic motor connected with the force transmitting member to turn the steerable vehicle wheels.

A steering apparatus constructed in accordance with the present invention may be used in a steer-by-wire steering system. However, the steering apparatus may be used in other systems. For example, a steering apparatus constructed in accordance with the present invention may be used in a steering system in which there is a mechanical connection between the steering wheel and the steering apparatus.

BRIEF DESCRIPTION OF THE DRAWINGS

The foregoing and other features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
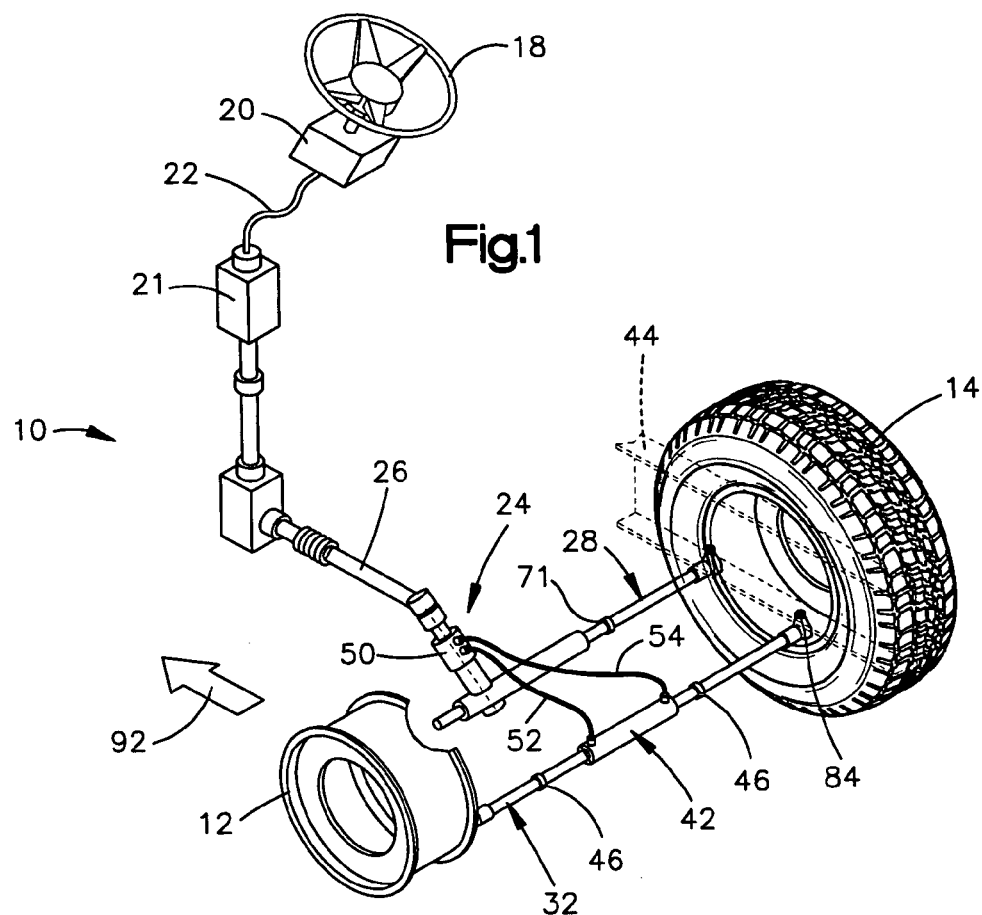
FIG. 1 is a schematic pictorial illustration of a portion of a vehicle having a steering apparatus constructed in accordance with the present invention.

A steering apparatus 10 (FIGS. 1 and 2) is operable to turn steerable front wheels 12 and 14 of a vehicle. The illustrated steering apparatus 10 is a steer-by-wire steering system. Therefore, the steering apparatus 10 is free of a mechanical connection between the steering wheel 18 and the steerable vehicle wheels 12 and 14 during normal operation. However, if desired, the steering apparatus 10 may have a mechanical connection between the steering wheel 18 and the steerable vehicle wheels 12 and 14.

The steering apparatus 10 includes a manually rotatable steering wheel 18 which is connected with a transmitter assembly 20. The transmitter assembly 20 is connected with a receiver assembly 21 by a flexible cable 22. The transmitter assembly 20, receiver assembly 21 and flexible cable 22 have the same construction and mode of operation as is disclosed in U.S. Pat. No. 6,655,709. However, the transmitter assembly 20 and receiver assembly 22 may be constructed and operated in the manner disclosed in U.S. Pat. No. 6,546,322 if desired.

The receiver assembly 21 is connected with a rack and pinion power steering mechanism 24 by a shaft assembly 26. A connector member 28 connects the rack and pinion power steering mechanism 24 to the steerable vehicle wheel 14. The connector member 28 is the only connection between the rack and pinion steering mechanism 24 and the steerable vehicle wheels 12 and 14.

A force transmitting member or tie rod 32 extends between and is connected to the steerable vehicle wheels 12 and 14. The steerable vehicle wheels 12 and 14 are supported for turning movement about pivot connections or kingpins 36 and 38 (FIG. 2). A power steering motor 42 is connected with a frame 44 (indicated in dashed lines in FIG. 1) of the vehicle and with the force transmitting member 32. Pivot joints, specifically ball and socket joints 46, are provided in the force transmitting member 32.

The power steering motor 42 (FIG. 2) is connected with a valve assembly 50 in the rack and pinion power steering mechanism 24 by hydraulic fluid conduits 52 and 54. The valve assembly 50 is supplied with hydraulic fluid by a power steering pump (not shown) through a supply conduit 56 and is connected with a fluid reservoir through a drain conduit 58. The valve assembly 50 may have a construction similar to the construction disclosed in either U.S. Patent No. 3,709,099 or U.S. Patent No. 5,582,207.

The valve assembly 50 is connected with a pinion gear 62 (FIG. 2). The pinion gear 62 is disposed in meshing engagement with a rack 66. A right (as viewed in FIG. 2) end portion 70 of the rack is connected with the connector member 28 and steerable vehicle wheel 14 by a ball and socket pivot joint 71. The opposite or left (as viewed in FIG. 2) end portion 72 of the rack 66 is not connected to the steerable vehicle wheel 12. Thus, the end portion 72 of the rack 66 is spaced from the steerable vehicle wheel 12 and is free of connection with a member which extends between the end portion 72 of the rack and the second steerable vehicle wheel.

Figure 2:
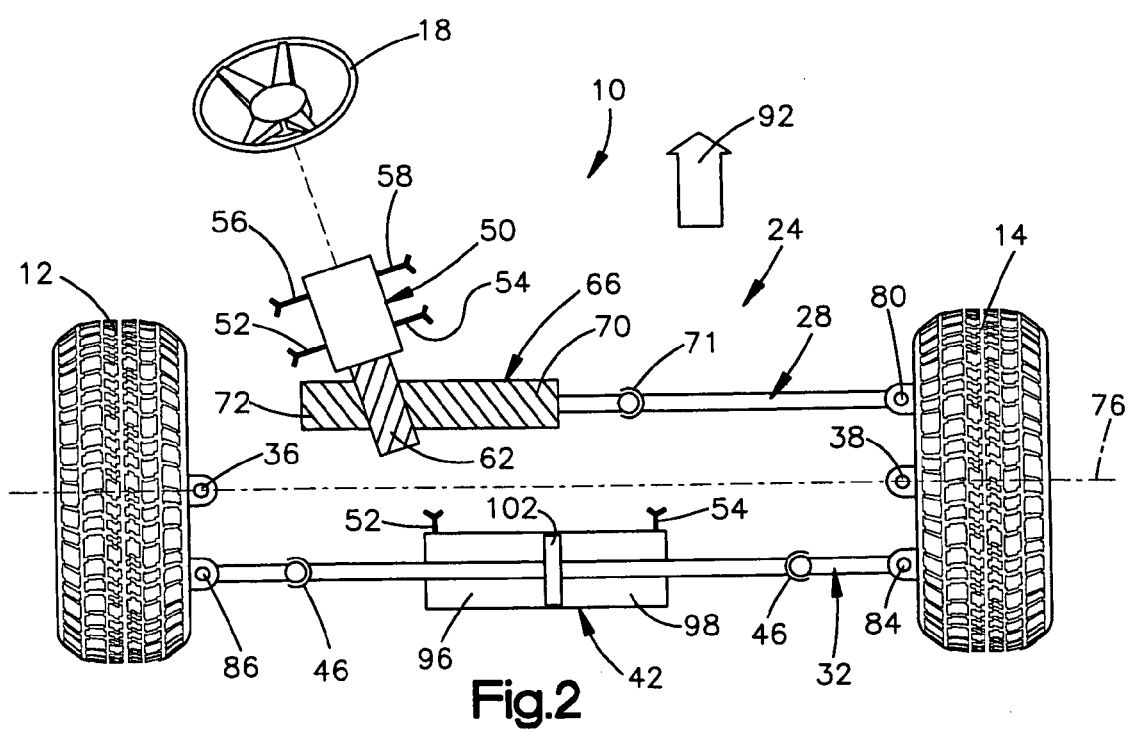
FIG. 2 is a schematic top plan view of the steering apparatus of FIG. 1.

The connector member 28, which is connected to the left end portion 70 of the rack 66 and the steerable wheel 14, has a central axis which extends parallel to the central axis of the force transmitting member 32 when the steerable vehicle wheels 12 and 14 are in the straight ahead orientation of FIGS. 1 and 2. The connector member 28 and force transmitting member 32 both extend parallel a horizontal axis 76 through the pivot connections 36 and 38 for the steerable wheels 12 and 14 when the steerable vehicle wheels 12 and 14 are in the straight ahead orientation.

Upon operation of the steering apparatus 10, the steerable vehicle wheels 12 and 14 are pivoted about vertical axes which extend perpendicular to and intersect the axis 76. As this occurs, the right (as viewed in FIG. 2) end portion of the connector member 28 pivots about a vertical axis extending through a pivot connection 80 between the connector member 28 and the steerable vehicle wheel 14. At the same time, opposite end portions of the force transmitting member 32 pivot about vertical axes extending through pivot connections 84 and 86 which connect opposite ends of the force transmitting member 32 to the steerable vehicle wheels 12 and 14.

When the vehicle having the steerable wheels 12 and 14 is proceeding in a straight ahead direction, that is, in the direction of an arrow 92 in FIGS. 1 and 2, rotation of the steering wheel 18 results in actuation of the valve assembly 50. Actuation of the valve assembly 50 results in relatively high fluid pressure being conducted to either a left chamber 96 or a right chamber 98 (FIG. 2) of the power steering motor 42. The opposite chamber is connected in fluid communication with a fluid reservoir.

The fluid pressure in the high pressure chamber, for example, the left chamber 96, is applied against a piston 102 which is connected to the force transmitting member 32. At the same time, the right chamber 98 is connected with the drain conduit 58 through the valve assembly 50. This results in the steerable wheels 12 and 14 of the vehicle being turned toward the left, that is, in a counterclockwise direction, about the pivot connections 36 and 38. As the vehicle wheels 12 and 14 are turned, the rack 66 moves toward the left (as viewed in FIG. 2) and rotates the pinion gear 62. When the steerable vehicle wheels 12 and 14 have been turned to an extent corresponding to the extent of rotation of the steering wheel 18, the valve assembly 50 is operated to an unactuated or initial condition.

The manner in which the valve assembly 50 cooperates with the pinion gear 62 and rack 66 is well known and will not be further described herein in order to avoid prolixity of description. From the above description of the invention, those skilled in the art will perceive improvements, changes and modifications. Such improvements, changes and modifications within the skill of the art are intended to be covered by the appended claims.

The invention claimed is:

1. An apparatus for use in turning first and second steerable vehicle wheels upon manual rotation of a steering wheel, said apparatus comprising:
   a rack having first and second end portions,
   a pinion disposed in meshing engagement with said rack, said pinion being connected with the steering wheel and being rotatable relative to said rack upon rotation of the steering wheel;
   a valve connected with said pinion, said valve being actuatable upon rotation of the steering wheel;
   a force transmitting member having a first end portion connected to the first steerable vehicle wheel and a second end portion connected to the second steerable vehicle wheel;
   a hydraulic motor connected with said force transmitting member, said hydraulic motor being connected in fluid communication with said valve,
   said valve being operable upon rotation of the steering wheel in a first direction to effect operation of said hydraulic motor and turning movement of the steerable vehicle wheels in a first direction, said valve being operable upon rotation of the steering wheel in a second direction to effect operation of said hydraulic motor and turning movement of the steerable vehicle wheels in a second direction, and
   a connector member which connects said first end portion of said rack with the first steerable vehicle wheel, said second end portion of said rack being spaced from the second steerable vehicle wheel and disconnected from the second steerable vehicle wheel, said force transmitting member is spaced from and has a longitudinal central axis which is generally parallel to a longitudinal central axis of said connector member.

2. An apparatus as set forth in claim 1 wherein said apparatus is a steer-by-wire steering system which is normally free of a mechanical connection between the steering wheel and the first and second steerable vehicle wheels.

3. An apparatus as set forth in claim 1 wherein said motor includes a piston disposed within a cylinder, said cylinder being disposed in a coaxial relationship with said force transmitting member.

4. An apparatus as defined in claim 1 wherein said second end of said rack is free of a connection with a member which extends between said second end portion of said rack and said second steerable vehicle wheel.

5. An apparatus for use in turning first and second steerable vehicle wheels upon manual rotation of a steering wheel, said apparatus comprising:
   a rack having first and second end portions,
   a pinion disposed in meshing engagement with said rack, said pinion being connected with the steering wheel and being rotatable relative to said rack upon rotation of the steering wheel;
   a valve connected with said pinion, said valve being actuatable upon rotation of the steering wheel;
   a force transmitting member having a first end portion connected to the first steerable vehicle wheel and a second end portion connected to the second steerable vehicle wheel;
   a hydraulic motor connected with said force transmitting member, said hydraulic motor being connected in fluid communication with said valve,
   said valve being operable upon rotation of the steering wheel in a first direction to effect operation of said hydraulic motor and turning movement of the steerable vehicle wheels in a first direction, said valve being operable upon rotation of the steering wheel in a second direction to effect operation of said hydraulic motor and turning movement of the steerable vehicle wheels in a second direction, and
   a connector member which connects said first end portion of said rack with the first steerable vehicle wheel, said second end portion of said rack being spaced from the second steerable vehicle wheel and disconnected from the second steerable vehicle wheel, said connector member is spaced from said force transmitting member and has a first end portion connected to said first end portion of said rack and a second end portion which is connected to the first steerable vehicle wheel, said connector member has a longitudinal central axis which extends through the first steerable vehicle wheel at a location spaced from a location where said first end portion of said force transmitting member is connected to the first steerable vehicle wheel.

6. An apparatus as set forth in claim 5 wherein said apparatus is a steer-by-wire steering system which is normally free of a mechanical connection between the steering wheel and the first and second steerable vehicle wheels.

7. An apparatus as set forth in claim 5 wherein said motor includes a piston disposed within a cylinder, said cylinder being disposed in a coaxial relationship with said force transmitting member and has a longitudinal central axis which is generally parallel to the longitudinal central axis of said connector member.

* * * * *